J. F. MONNOT.
COMPOUND METAL BODY AND PROCESS OF MAKING THE SAME.
APPLICATION FILED JAN. 29, 1908.
1,001,669.
Patented Aug. 29, 1911.
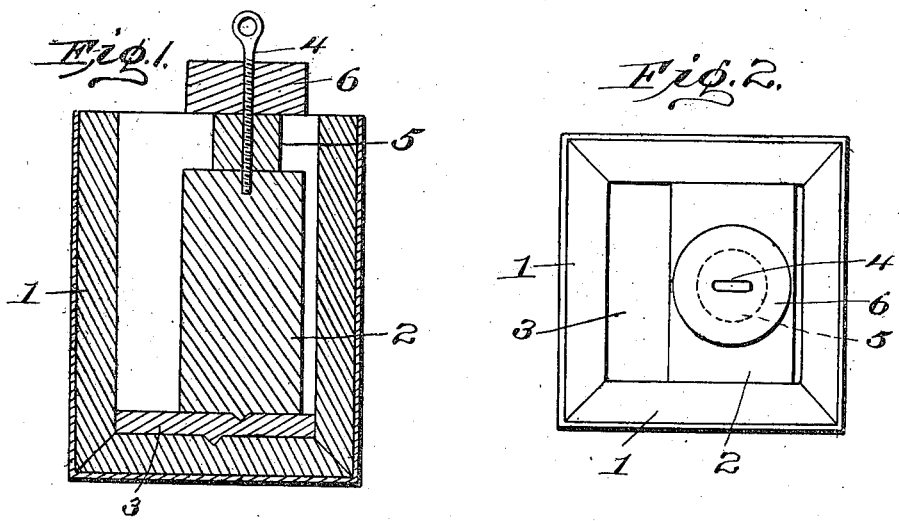
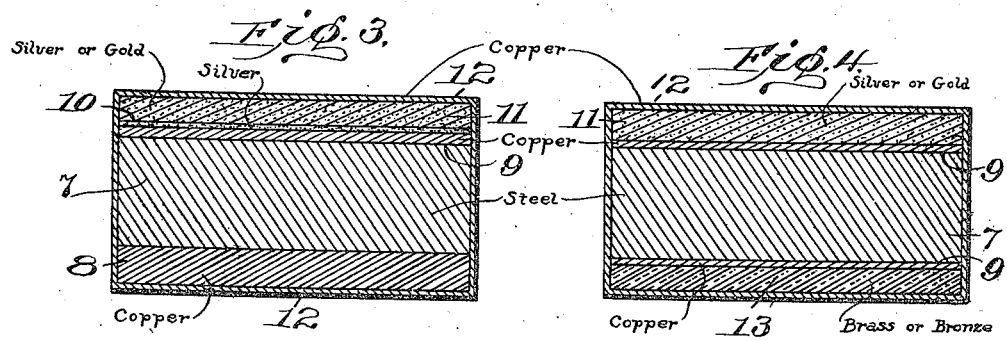
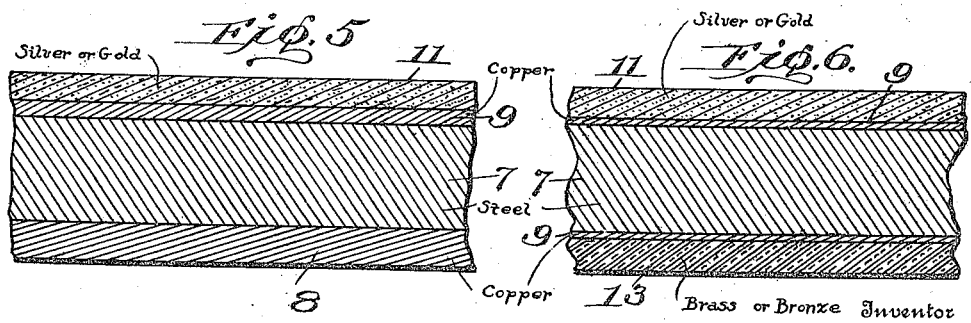

UNITED STATES PATENT OFFICE.

JOHN FERREOL MONNOT, OF NEW YORK, N. Y., ASSIGNOR TO DUPLEX METALS COM PANY, OF NEW YORK, N. Y., AND CHESTER, PENNSYLVANIA, A CORPORATION O. NEW YORK.

COMPOUND METAL BODY AND PROCESS OF MAKING THE SAME.

1,001,669.  Specification of Letters Patent.  Patented Aug. 29, 1911.

Application filed January 29, 1908. Serial No. 413,259.

*To all whom it may concern:*

Be it known that I, JOHN F. MONNOT, a citizen of the United States, residing at New York, in the county of New York and State of New York, have invented a certain new and useful Compound Metal Body and Process of Making the Same; and I do hereby declare the following to be a full, clear, and exact description of the same, such as will enable others skilled in the art to which it appertains to make and use the same.

This invention relates to compound metals and processes of producing the same, and comprises a body of metal having a layer or facing of copper or cupriferous metal on the one side and a layer or facing of noble metal, such as silver or gold on the other with an intervening and reinforcing layer of a stronger ferrous metal between, firmly and permanently united to said other layers; and my invention also comprises a process of producing such compound metal bodies comprising the coating of a ferrous metal billet or plate with a cohering welded-on layer of copper; coextension of the joined metals to form a plate and to compact and harden said copper, and union of a layer of noble metal to the copper on one side of said plate; all as more fully hereinafter set forth and as claimed.

For many articles, such as culinary utensils, like sauce pans, it is desirable to have sheet metal faced on one side with silver, gold or other incorrodible noble metal and on the other with copper, or a cupriferous metal like brass or bronze, the former layer being for the interior of the vessel and the latter for its exterior. Foods have substantially no action on silver or gold, and these metals being highly conductive of heat, foods do not burn or bake to their surfaces as with enamel-lined vessels. Such silver or gold lined vessels are therefore hygienic and sanitary. For the exterior surface gold and silver are less well adapted, being too soft and valuable to permit free scouring and cleansing to remove soot and dirt. For such exterior surfaces copper, brass or bronze is well adapted. In the prior art vessels of this nature have sometimes been made by uniting a plate of copper to one of silver and shaping; a procedure made possible by the ready union of the two like metals silver and copper. Electroplating a lining layer of silver in a copper vessel is also sometimes resorted to; a procedure, however, which for this purpose is of little value, electrocoatings being invariably porous, so that the lining of incorrodible metal is practically purposeless, and adheres to the base with so little strength as to be unable to stand the rough usage of the kitchen. Besides, copper and silver, both being weak, soft metals, such compound metal articles are readily dented and damaged.

It is the purpose of the present invention to provide a compound sheet metal from which such vessels may be readily made by stamping, spinning and like operations; such sheet metal being faced on the one side, intended for the interior of the vessel, with an impervious layer of the noble metals silver or gold; and faced on the other with a similar layer of copper, bronze or brass, both facings being integrally, permanently and firmly united to an intervening strengthening layer of rigid ferrous metal. Silver and gold are both noble metals which while relatively high melting, fuse at temperatures below 3000° F. so that while they are sufficiently high melting to withstand working in the presence of steel at steel working temperatures they are still easily worked.

In a prior Patent No. 853,716 May 14, 1907, I have described and claimed a process of uniting unlike metals based on the fact that the lack of affinity which iron, steel and like metals display toward such unlike metals as copper, gold, silver and like metals at ordinary working temperatures disappears when metals of the latter class are contacted with metals of the former class at a temperature much above their melting point. At such elevated temperature these latter metals appear to acquire an enhanced activity or affinity, being in a condition which I have called, for lack of other name the "supermolten condition," and are able to make molecular unions with ferrous metals which are or are equivalent to, weld-unions. A clean steel surface contacted with supermolten silver or copper can be given a coating layer of such silver or copper which after cooling cannot be again removed by the action of cleaving tools, such as a cold chisel, by violent changes of temperature as in heating and quenching, or by mechanical stresses such as bending to rupture. The stated process though well adapted for the direct union of steel and silver and eminently suitable for large scale work is not as well adapted for work on a smaller scale.

The present invention provides a simple cheap and ready method of producing a similar article on a smaller scale while still retaining the advantages of the large scale treatment of the steel reinforcement or core. For the purposes for which such metal is here intended the article produced is even better, being double faced; a result which is difficult to attain without undue complications by the method of the patent.

A steel or iron billet is first coated with copper by any of the methods described in the patent. If the ultimate product is to be faced with copper on one side and silver or gold on the other, the billet is given a thicker coat on one side than the other, say ten per cent. copper on one side and two per cent. on the other. This result may be accomplished by suitably spacing the steel billet within the mold in which the copper is applied. If such product however, is to be brass or bronze faced on one side, the copper coating may be thin on both sides. The billet with the thick and thin coatings is next extended to form a plate, as by rolling, and the thin-coated side is thoroughly cleaned or polished, the other or thick-coated side being left rough and covered with the oxid formed in the hot-working to produce the plate. On the cleaned side there is galvanically deposited a thin or flash coating of silver so as to have a clean non-oxidizing metallic surface and protect the readily oxidizable copper against oxidation by air. On this silvered side is laid a plate or slab of silver, and the two plates are heated together till they attain a good rolling temperature, when they are rolled down together. The flash coating of silver readily unites with the clean copper surface under the action of heat and pressure and with the plate of silver as well, forming an integral weld-like union with both. The plate of silver is preferably of cast metal, electrically produced plates being porous. As in rolling the rolls tend to dirty the surface of the silver more or less, and as it is desirable to hold the silver and copper-coated steel plates together during the heating, these plates are preferably wrapped with a thin sheet of copper before they are placed in the furnace, which serves to hold them together, and also to exclude furnace gases to a great extent at least, and which remains around the plates during the rolling. This wrapping is of course oxidized, during the heating and rolling, and may be oxidized away altogether during the operation, so that at the end the silver surface is exposed. If a little of the wrapping remains after the rolling, it may be removed with acid, such as nitric acid. Preferably the copper wrapping is of such thinness that it just lasts through the rolling.

A plate made in the described manner can of course be of any gage desired, and from it can be formed culinary vessels of any description or size, by stamping, spinning, etc. Prepared in the described manner, it will have a facing layer of copper on one side and one of silver on the other, with an intermediate stiffening or strengthening layer of a strong ferrous metal, inseparably united by a coherent, as distinguished from an adherent union to the non-ferrous metal on either side. The silver side is usually employed for the interior of the vessel. A compound plate having a facing layer of gold may be made in the same manner, a plate of gold being substituted for the silver plate in the described process. The gold will unite readily to the silver flash coat.

When a layer of brass or bronze is desired in lieu of one consisting wholly of copper, or when the plate is to be coated on both sides with noble metal, the original billet is made with a thin coating of copper on both sides, is extended to a plate, is polished on both sides and has a clean plate of brass, bronze, silver, etc., laid against one side and a silver, gold or other noble metal plate against the other. In this operation, the thin copper wrapping is preferably so applied as to prevent access of air during the heating as much as possible. When so applying the thin copper wrapping, the intermediate flash coating of silver may be omitted, its chief function being to preserve a metallic surface upon the copper layer during heating.

The accompanying drawings illustrate the carrying out of my said process.

Figures 1 and 2 are respectively, a vertical transverse section and a top view of a mold with billet therein, as arranged for the forming of the first coating on the billet; Fig. 3 shows a transverse section of the coated and rolled slab prepared for uniting to silver or other noble metal, and also shows a plate of such noble metal in contact with the slab and a protective wrapping; Fig. 4 is a similar view showing a pile as arranged when noble metal is to be applied to one side of the slab, and an alloy, such as brass or bronze, to the other side thereof. Figs. 5 and 6 show transverse sections of finished products.

Referring first to Figs. 1 and 2, 1 designates a mold of suitable construction and 2 a billet to be coated placed within said mold, said billet fitting the mold closely on two sides and being much closer to the wall of the mold on one of its remaining sides, than on the other. 3 designates a refractory centering protector for the lower end of the billet, suitably secured thereto; 4 designates a porter bar, 5 a bushing of refractory material and 6 a weight. The billet having been placed within the mold, supermolten metal (copper, preferably) is cast therein; for example, in the manner set forth in my application Sr. No. 400,843. This molten metal when it has solidified is weld-united to two faces of the billet forming a thick coating on one side and a much thinner coating on the other. The billet so produced is then rolled or otherwise worked down into a plate or bar of desired size, as shown in Fig. 3 in which 7 designates the steel base, 8 a thick copper coating on one side thereof and 9 a thinner copper coating on the opposite side thereof. During this working down, the copper layers being compressed between the relatively stiff steel core and the working tools assume throughout their mass a peculiar hardened texture comparable with the surface texture of hard drawn wire. To protect this copper coating against oxidation it may have applied to it a thin flash coating of silver or the like 10. In Fig. 3 the thickness of this flash coating is necessarily greatly exaggerated. Upon this flash coating is laid a slab or bar 11 of silver or other noble metal to be united to slab or bar 7, and preferably, a wrapping layer of thin copper or the like 12 is placed around the pile so formed, to protect against oxidation. The pile is then heated to a temperature suitable for hot working, and when so heated is rolled or otherwise worked down until reduced to the desired thickness. Any portion of the copper wrapping 12 remaining is then removed as previously described.

Fig. 4 shows a similar pile in which the steel base is thinly coated on both sides with copper, one side of the pile having a layer of noble metal to be united to it, the other side having a layer 13 of brass, bronze or the like to be united to it. In this case the flash coating of silver or the like is omitted as is permissible when the protecting wrapping 12 is so wound as to form an efficient covering as previously stated.

Fig. 5 shows a transverse section on an exaggerated scale of the finished plate comprising a layer of copper, etc., on one side, and silver, etc., on the other side welded to a thin copper coating; and Fig. 6 shows a similar section of a plate so coated on one side with silver etc. and coated on the other side with some metal other than that of the thin coating.

What I claim is:—

1. The process of producing compound metal bodies which comprises applying to a ferrous metal base a welded-on coating of non-ferrous metal by contacting such base with a supermolten body of such non-ferrous metal, placing against the base carrying such coating a solid mass of noble metal having a melting point below 3000° F. and heating said objects and working them together while hot, thereby uniting the metals.

2. The process of producing compound metal objects which consists in applying copper in a supermolten state to a ferrous metal base to form a layer of copper having a cohering union with said base, extending the compound billet so formed, placing a layer of a nobler metal on one side of the extended billet and while said extended billet and layer of nobler metal are hot, working them together and thereby uniting them.

3. The process of producing compound metal objects which consists in applying copper in a supermolten state to a ferrous metal base to form a layer of copper having a cohering union with said base, extending the compound billet so formed, applying to a surface thereof a flash coating of a nobler metal, placing against said flash coating a layer of a noble metal and while said extended billet and noble metal are hot, working them together and thereby uniting them.

4. The process of producing compound metal objects which consists in applying copper in a supermolten state to a ferrous metal base to form a layer of copper having a cohering union with said base, extending the compound billet so formed, placing a layer of silver on one side of the extended billet and while said extended billet and silver are hot, working them together and thereby uniting them.

5. The process of producing compound metal bodies which comprises weld-uniting to opposite sides of a ferrous metal base layers of non-ferrous metal, by contacting such metals one metal being in the liquid state, the layer on one side being relatively thin and that on the other side relatively thick, placing against base on the more thinly coated side a solid mass of noble metal having a melting point below 3000° F., and capable of uniting with such coating when worked hot therewith, and heating said objects and working them together while hot, thereby uniting the metals.

6. The process of producing compound metal bodies which comprises weld-uniting to opposite sides of a ferrous metal base, layers of copper by contacting such metals one metal being in the liquid state, the layer on one side relatively thin and that on the other side relatively thick, placing against the more thinly coated side a solid mass of noble metal having a melting point below 3000° F. and capable of uniting with the copper when worked hot therewith, and heating said objects and working them together while hot, thereby uniting the metals.

7. The process of producing compound metal bodies which comprises weld-uniting to opposite sides of a ferrous metal base, layers of copper by contacting such metals one metal being in the liquid state, the layer on one side relatively thin and that on the other side relatively thick, applying to the thinly coated side a flash coating of nobler metal and placing against said flash coating a layer of noble metal having a melting point below 3000° F. and capable of uniting with the copper when worked hot therewith, and heating said objects and working them together while hot, thereby uniting the metals.

8. The process of producing compound metal bodies which comprises weld-uniting to opposite sides of a ferrous metal base, layers of copper, by contacting such metals one metal being in the liquid state, the layer on one side relatively thin and that on the other side relatively thick, applying to the thinly coated side a flash coating of nobler metal and placing against said flash coating a layer of silver, and heating said objects and working them together while hot, thereby uniting the metals.

9. A compound metal object comprising a ferrous base, having on one side a weld-united layer of non-ferrous metal and on its opposite side another weld-united layer of such non-ferrous metal, and having a layer of noble metal united to one of such layers by a cohering union.

10. A compound metal object comprising a ferrous base, having on one side a relatively thick weld-united layer of non-ferrous metal and on its opposite side a relatively thin weld-united layer of such non-ferrous metal, and having a layer of noble metal united to such relatively thin coating of non-ferrous metal by a cohering union.

11. A compound metal object comprising a ferrous base having on one side a weld-united layer of copper and on its opposite side another weld-united layer of copper, and having a layer of noble metal united to one of such copper layers by a cohering union.

12. A compound metal object comprising a ferrous base, having on one side a relatively thick weld-united layer of copper and on its opposite side a relatively thin weld-united layer of such copper, and having a layer of noble metal united to such relatively thin coating of copper by a cohering union.

In testimony whereof I affix my signature, in the presence of two witnesses.

JOHN FERREOL MONNOT.

Witnesses:
H. M. MARBLE,
K. G. LEARD.